United States Patent
Conover et al.

[11] Patent Number: 5,870,154
[45] Date of Patent: Feb. 9, 1999

[54] SIGNAL ENHANCEMENT SYSTEM

[75] Inventors: Kurt M. Conover, Bernalillo County; Bill Alan Dickey, Sandoval County, both of N. Mex.

[73] Assignee: Honeywell Inc., Minneapolis, Minn.

[21] Appl. No.: 613,236

[22] Filed: Mar. 8, 1996

[51] Int. Cl.$^6$ ...................................................... H04N 3/57
[52] U.S. Cl. ........................ 348/673; 348/575; 348/691
[58] Field of Search ................................. 348/575, 673, 348/674, 677, 678, 686, 687, 689, 691–698, 712; H04N 5/57

[56] References Cited

U.S. PATENT DOCUMENTS

| | | |
|---|---|---|
| 3,997,719 | 12/1976 | Judice . |
| 4,646,158 | 2/1987 | Ohno et al. . |
| 4,665,402 | 5/1987 | Young ........................................ 348/678 |
| 4,672,451 | 6/1987 | Berger . |
| 4,742,346 | 5/1988 | Gillette et al. . |
| 4,769,639 | 9/1988 | Kawamura et al. . |
| 5,099,330 | 3/1992 | Fuse et al. ................................. 358/169 |
| 5,153,756 | 10/1992 | Ike . |
| 5,173,776 | 12/1992 | Rigg et al. . |
| 5,257,108 | 10/1993 | Muroaka . |
| 5,298,892 | 3/1994 | Shapiro et al. . |
| 5,315,389 | 5/1994 | Izawa ........................................ 348/672 |
| 5,321,513 | 6/1994 | Kondo ....................................... 348/691 |
| 5,406,336 | 4/1995 | Harlos et al. ............................. 348/673 |
| 5,453,757 | 9/1995 | Date et al. . |
| 5,546,134 | 8/1996 | Lee ........................................... 348/673 |

FOREIGN PATENT DOCUMENTS

| | | | |
|---|---|---|---|
| 0 311 236 A | 4/1989 | European Pat. Off. ......... | G09G 3/36 |
| 0205383 | 12/1986 | France ............................. | H04N 5/20 |
| 3714861 A1 | 11/1988 | Germany ......................... | H04N 5/57 |
| 63-267916 | 11/1988 | Japan ................................ | G02F 1/33 |
| 3-284792 | 12/1991 | Japan ................................ | G07G 3/36 |
| 4-280290 | 10/1992 | Japan ................................ | G09G 3/36 |
| 0654943 A2 | 11/1994 | United Kingdom ............. | H04N 5/20 |

OTHER PUBLICATIONS

English translation of German Patent Application DE 3,714,861 Oct. 1988.

*Primary Examiner*—Nathan Flynn
*Attorney, Agent, or Firm*—Andrew A. Abeyta; Kenneth J. Johnson

[57] ABSTRACT

A circuit and method for optimizing the display of a video signal on a display. Control of the display's brightness and contrast is based on aspects of a video signal, such as the average amplitude of the signal and the standard deviation. These aspects of the video signal are determined and the video signal manipulated based on the determined characteristics such that the resultant video signal is optimized to the dynamic range of the display.

26 Claims, 9 Drawing Sheets

SIGNAL ENHANCEMENT SYSTEM

The United States Government has acquired certain rights in this invention through Government Contract No. F33657-90-C-2233 awarded by the Department of the Air Force.

BACKGROUND OF THE INVENTION

1. Field of the Invention

The present invention relates generally to display systems and, more particularly, to systems for processing video signals.

2. Description of the Related Art

The viewability of an image on a display is generally determined by the brightness and contrast of the display and video signal corresponding to the image. The luminance of each display pixel corresponds to the amplitude of the video signal for the pixel. High amplitudes typically correspond to very bright pixels, while low amplitudes generally correspond to dark pixels. The range between the minimum and maximum amplitudes and the corresponding degrees of luminance may be subdivided into an almost infinite number of luminance levels, reflecting subtleties of shading and color represented by the video signal.

The display's brightness and contrast adjustments, on the other hand, are essentially static. Conventionally, brightness corresponds to a DC signal added to the video signal so that the overall signal level increases. As a result, the overall display becomes brighter. For CRT displays, the DC component is added to the video signal. For liquid crystal displays (LCDs), a backlight system responds to the brightness control.

Contrast, on the other hand, relates to the amplification of the video signal. Thus, as contrast increases, bright pixels become very bright, while relatively dark pixels become only slightly brighter.

The brightness and contrast controls allow the user to manually adjust the viewability of the data. Conventional display systems may also automatically compensate for brightness variations due to transmission loss. Conventional video signals typically include a sync signal which display circuitry may use to determine transmission loss. Typically, the video signal includes a sync signal having a specified magnitude, such as 2.86 volts. When the display receives a video transmission, it compares the measured sync signal amplitude to the target amplitude to determine the transmission loss. For example, if the target sync signal has an amplitude of 2.86 volts and the received sync signal was only 1.43 volts, the display logic assumes that the entire signal is also attenuated due to transmission loss and should amplified by a factor of two.

Conventional video displays, such as cathode ray tube (CRT) displays, also typically have a wide dynamic range (i.e., a number of different and distinguishable colors and shades) for displaying each pixel with the appropriate degree of brightness according to the video signal and the brightness and contrast criteria. Small increases in amplitude cause small increases in brightness, regardless of whether the increase is due to a change the video signal or the brightness or contrast control. Consequently, subtle differences in the video signals induce subtle differences in the picture rendered by the display.

In some applications, however, subtle differences are not apparent to the user. For example, in some radar-based imaging applications, the dynamic range or peak-to-peak variation of the video signal information is relatively small. A CRT display shows variations in the video signal as slightly different shades. Where the variations are very small, the differences between different shades in the image may be so slight as to be nearly imperceptible.

This problem is compounded for various modern displays which do not provide the broad dynamic range of CRT displays. Limitations in a display's dynamic range may restrict, or even negate, the display of subtleties in the image. For example, while the dynamic range of various LCDs varies according to type and manufacturer, LCDs generally have a limited dynamic range, particularly in comparison to CRT displays. A typical LCD exhibits a dynamic range limited to, for example, 64 or even 16 shades of gray.

For displays with limited dynamic range, effectively displaying and viewing minor variations in the data or information content is difficult, if not impossible. With limited dynamic range, slight variations in the video signal are commonly lumped into the same shade. As a result, variations in the video signal may not affect the rendered image at all, potentially obscuring vital information. Thus, it would be advantageous to provide a system for utilizing the available dynamic range of a display to enhance the presentation of data.

SUMMARY OF THE INVENTION

The present invention addresses dynamic range limitations by providing a signal enhancement system that dynamically optimizes the signal according to the dynamic range of the display and the signal to be presented. A signal enhancement system according to various aspects of the present invention identifies and analyzes, aspects of the signal to optimize the viewability of the signal over the dynamic range of the display.

A suitable signal enhancement system comprises signal identification circuitry which identifies various properties of the signal, and signal conversion circuitry which processes the signal to utilize more of the display's dynamic range based on the properties identified by the identification circuitry. Based on the signal characteristics established by the signal identification circuit, the signal conversion circuit suitably adjusts the presentation of the data to occupy the full dynamic range of the display system. In particular, the signal conversion circuit may dynamically adjust the brightness and contrast of the display to enhance viewability. In addition, the signal conversion circuit may be implemented to facilitate nonlinear processing of the data across the dynamic range.

BRIEF DESCRIPTION OF THE DRAWING FIGURES

A preferred exemplary embodiment of the present invention is described in conjunction with the appended drawing figures in which like numerals denote like elements, and.

DETAILED DESCRIPTION OF A PREFERRED EXEMPLARY EMBODIMENT

Figure 1:
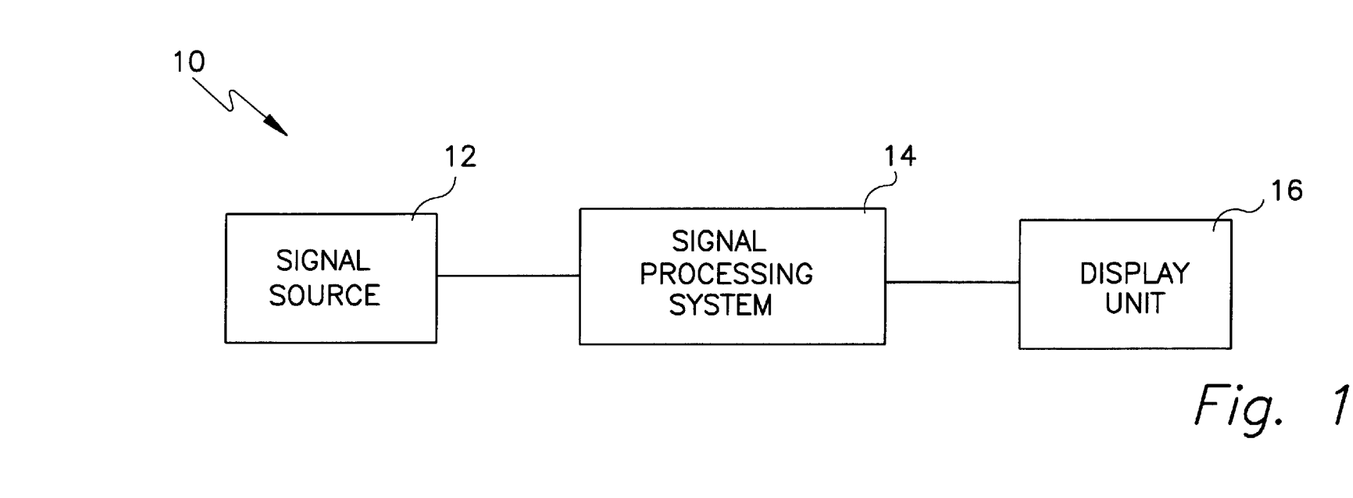
FIG. 1 is a block diagram of an exemplary video signal enhancement system.

A display system according to various aspects of the present invention receives signals and selectively analyzes and manipulates the signals to enhance the display of images represented by the signal. While the manner in which the signal is enhanced is described in greater detail hereinbelow, in general, selected properties of the signal (e.g., a video signal) are identified and the signal is manipulated to enhance the display of the information. Referring to FIG. 1, an exemplary signal enhancement system 10 according to various aspects of the present invention comprises a signal source 12; a signal processing system 14; and a display unit 16. As described in greater detail below, signal source 12 generates at least one signal to be processed and rendered by display unit 16. Signal source 12 transmits the signal to signal processing system 14, which processes the signal to selectively enhance the display of the data contained in the signal. Signal processing system 14 provides the processed data to display unit 16 for rendering the appropriate images according to the processed data.

Signal source 12 suitably comprises any source capable of producing or transmitting a signal, such as a video camera, microprocessor, radar system, infrared scanning system and/ or the like., that may be converted to a video signal. Signal source 12 may generate any type of signal, for example a digital, analog, or modulated signal representative of the data to be displayed. Further, signal source 12 suitably generates a signal suitable for conversion to viewable data regardless of the nature of the original data, including sensed light or heat, pixel data stored in a computer memory, and the like. It should be noted that the single signal system of FIG. 1 corresponds to a gray scale display having a single stream of data. The present system is easily applied, however, to a color display system by using three separate streams of data from signal source 12 (corresponding, for example, to three color components, such as red, green, and blue) and combining the streams for presentation at display unit 16.

Display unit 16 receives a video signal and renders a viewable image based on the received data. Display unit 16 suitably comprises any device capable of displaying information, such as a liquid crystal display (LCD), a cathode ray tube (CRT), or a head up display (HUD). In a preferred exemplary embodiment of the present invention, display unit 16 comprises a flat panel LCD. In addition, display unit 16 further comprises components typically associated with a display system, such as any required power supply, memory requirements, and the like.

Signal processing system 14 receives data from signal source 12 and processes the data to generate an enhanced video signal, suitably by dynamically maximizing contrast of the signal over the dynamic range of display unit 16. Signal processing system 14 then supplies the enhanced signal to display unit 16.

Figure 2:
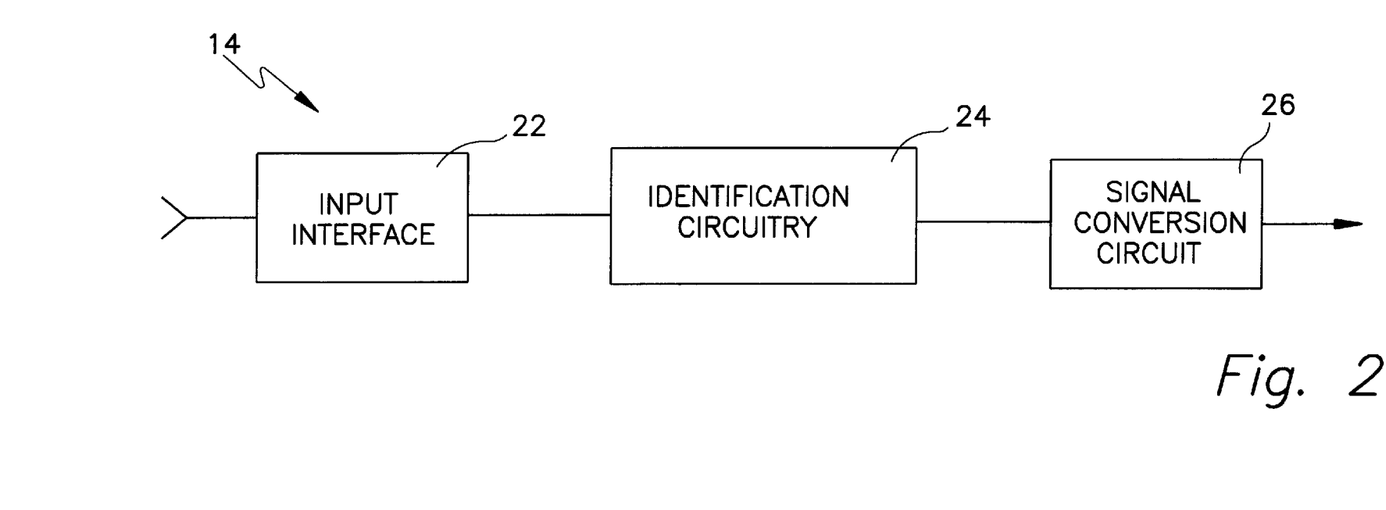
FIG. 2 is a block diagram of an exemplary signal processing system in accordance with the present invention.

Referring to FIG. 2, signal processing system 14 according to various aspects of the present invention suitably comprises an input interface 22, a signal identification circuit 24, and a signal conversion circuit 26. Input interface 22 suitably receives kits signal from signal source 12 and provides the interface between signal source 12 and signal identification circuit 24. For example, the signal from signal source 12 may comprise an analog signal. Where signal identification circuit 24 comprises digital circuitry, input interface 22 suitably comprises a quantizer which converts the analog signal from signal source 12 into a digital signal suitable for analysis by the digital circuitry associated with identification circuit 24. In addition, input interface 22 may perform further signal conditioning functions, such as filtering noise or compensating for transmission anomalies between signal source 12 and signal processing system 14. Input interface 22 suitably performs any other function that may be required to prepare the raw signal received from signal source 12 for processing by the downstream elements of signal enhancement system 10.

Signal identification circuit 24 suitably receives the conditioned signal from input interface 22, suitably using each frame of a video signal as a sample. Identification circuit 24 analyzes the conditioned signal to identify selected properties of the signal (e.g., the minimum and a maximum amplitudes of the signal), and based on the identified properties, cause signal conversion circuit 26 to modify the data provided to display unit 16 to utilize a greater portion of the display's dynamic range.

Signal conversion circuit 26 receives the signal from input interface 22 and the identified selected properties of the signal from identification circuit 24. Signal conversion circuit 26 suitably converts or manipulates the video signal in accordance with the particular identified properties to enhance the viewability of the image on display unit 16. In particular, signal conversion circuit 26 suitably redistributes the data in the signal across the dynamic range of display unit 16.

The particular properties to be identified may be selected according to the nature of the signal, relevant data to be enhanced, user desires, and the particular application. In particular, useful properties include minimum, peak, average or mean, mode, median, average deviation, or standard deviation amplitudes. In addition to statistical properties, relevant frequency properties of the signal may be identified through spectral analysis of the signal. The identified properties facilitate processing of the signal by signal conversion circuit 26 to generate an enhanced signal. It should be noted, however, that identification circuit 24 may be configured to identify any appropriate information relating to the signal. Stated another way, in accordance with the present invention, any manner of detecting any information of the signal may be employed.

Figure 5:
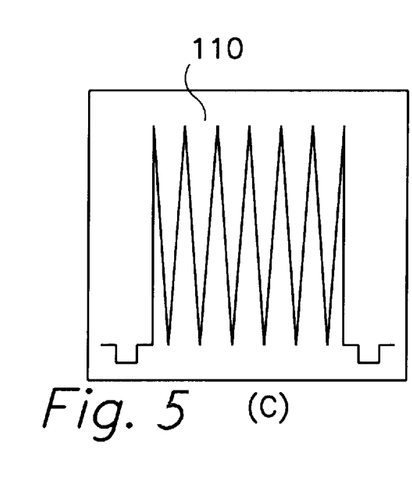
FIGS. 5A–C are graphical representations of an exemplary input signal, gain curve, and output signal, respectively.

Referring now to FIGS. 5A–5C to illustrate the operation of an exemplary embodiment of signal enhancement system 10, a sample of a digitized signal 100 is suitably provided to identification circuit 24 by input interface 22 (FIG. 5A). Identification circuit 24 is suitably configured to identify two properties of signal 100, such as the minimum and peak values of the signal 100 within the sample. Identification circuit 24 identifies the appropriate quantities and transmits the minimum and peak values to signal conversion circuit 26. Signal conversion circuit 26 subtracts a DC component approximately equal to the minimum value from the original signal 100 to generate a shifted signal 106 (FIG. 5B). To maximize the usage of display unit's 16 dynamic range, signal conversion circuit 26 suitably amplifies the shifted signal 102, based on the identified peak value and the maximum range of display unit 16, so that the amplified signal 110 uses a greater portion of the available dynamic range of display unit 16. Consequently, relatively small variations in the original signal 100 are converted to highly contrasting variations in the amplified signal 110.

Signal conversion circuit 26 may also be configured to consider additional properties of the video signal beyond the minimum and peak values to enhance the display. Under certain conditions, enhancement based solely on display unit 16 characteristics and the minimum and peak values of the signal may be ineffective. For example, an anomalous peak in the signal creates an uncharacteristically high peak value for the sample, which results in a very low amplification of the signal, even if the average amplitude of the data is relatively low. Consequently, the full dynamic range of display system 16 may not be adequately utilized. Thus, in accordance with various aspects of the present invention, identification circuit 24 also suitably identifies an average amplitude of original signal 100. The identified average may be utilized by signal conversion circuit 26 to determine how or whether signal 100 should be shifted. For example, if the average signal amplitude corresponds to the median of the dynamic range of display unit 16, it may not be desirable in certain applications to shift signal 100; if the identified average indicates that the video signal is near the saturation level of display unit 16, however, shifting signal 100 may be desirable.

In addition, the identified average may affect the amplification. For example as described above, an anomalous peak in the signal may result in relatively low gain. Signal conversion circuit 26 may, however, increase the gain based on the low average in spite of the anomalous peak. Though the anomalous peak may be clipped (i.e., amplified into saturation), the data of interest to the user is sufficiently amplified.

Signal processing system 14 may alternatively be implemented based on other video signal properties. For example, identification circuit 24 may be suitably configured to identify the mean and the average deviation of the video signal. A low average deviation or standard deviation indicates that the information content is suppressed about the average, corresponding to a low contrast image. Conversely, a large deviation indicates that the information is more widely spread about the average. Similarly, the average indicates where the information lies in relation to the dynamic range of display unit 16. A high average may indicate that the signal or information content of the signal is near saturation, i.e. very bright. Likewise, a low average may indicate that the signal or information content of the signal is near the base line of display unit's 16 dynamic range, i.e. very dark.

When identification circuit 24 identifies a high average and a low deviation for a particular signal, indicating that the information content is similar in shade and very bright, signal conversion circuit 26 is suitably configured to (a) subtract a DC component from the overall signal to reduce the average amplitude of the signal (i.e., makes the overall signal dimmer); and (b) amplify the shifted signal to occupy a greater proportion of the available dynamic range (i.e., magnify differences in amplitudes in the signal). Thus, a generally white image with relatively subtle variations is processed to create a generally black image with distinct variations ranging from nearly black to nearly white. This provides enhanced contrast of variations in the image to facilitate easy discerning of desired information in the image.

Figure 6A:
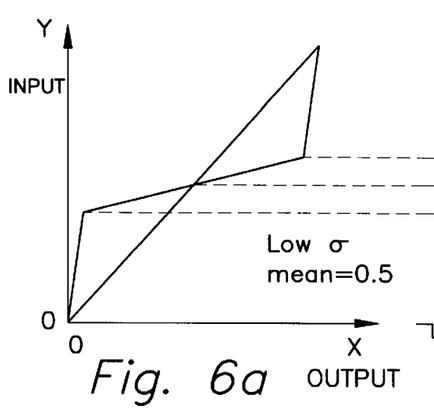
FIGS. 6A–C illustrate a gain curve, an original signal, and a modified signal for a low deviation, medium mean signal.
Figure 6B:
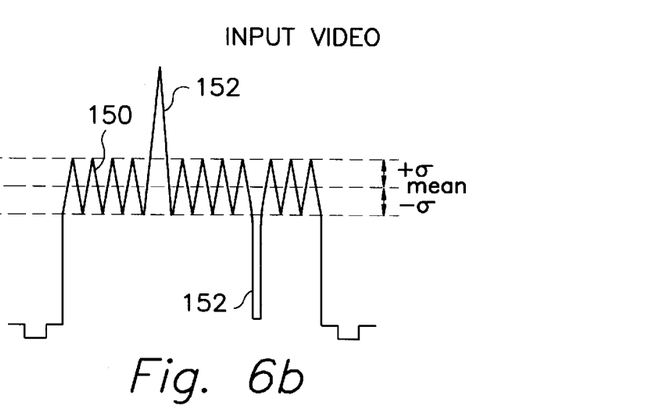
Figure 6C:
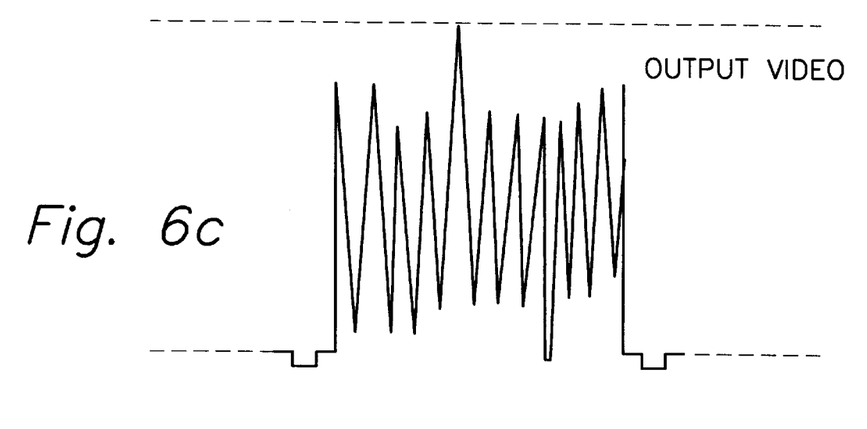
Figures 7A, 7B:
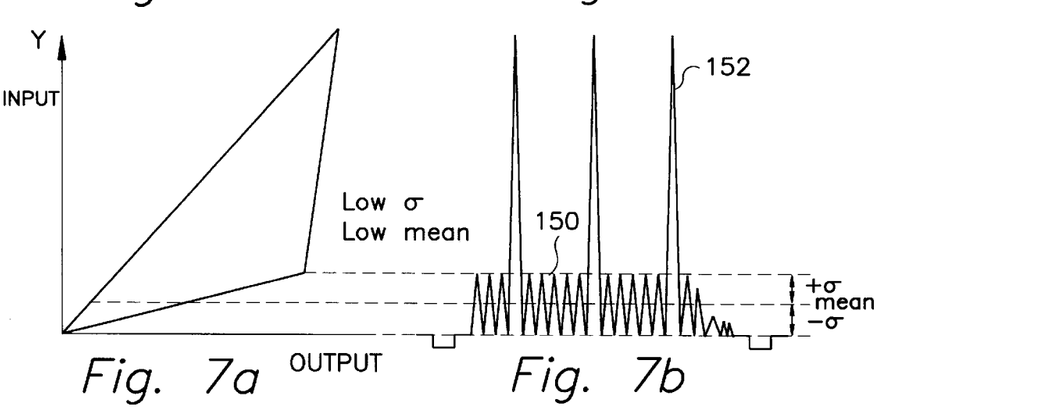
FIGS. 7A–C illustrate a gain curve, an original signal, and a modified signal for a low deviation, low mean signal.
Figure 7C:
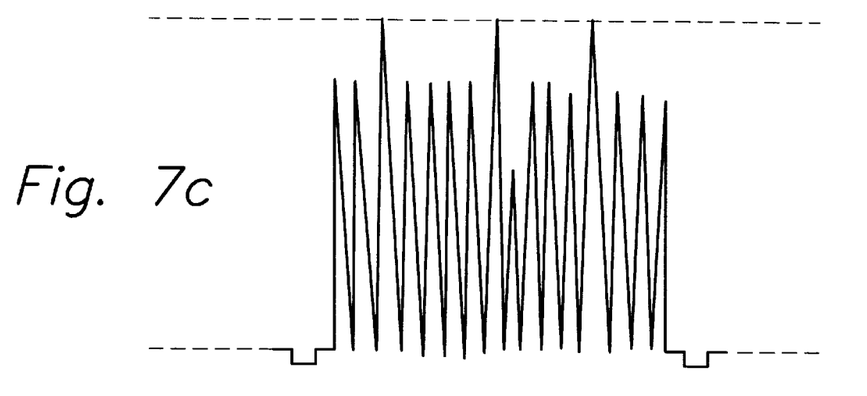
Figure 8A:
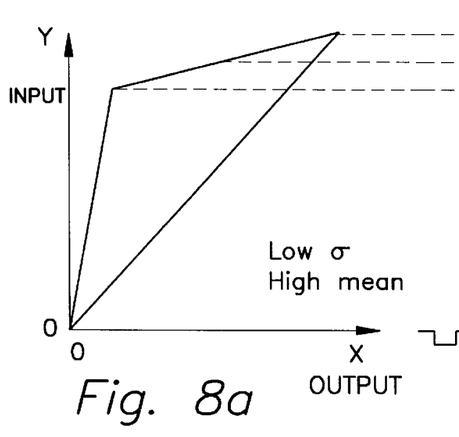
FIGS. 8A–C illustrate a gain curve, an original signal, and a modified signal for a low deviation, high mean signal.
Figure 8B:
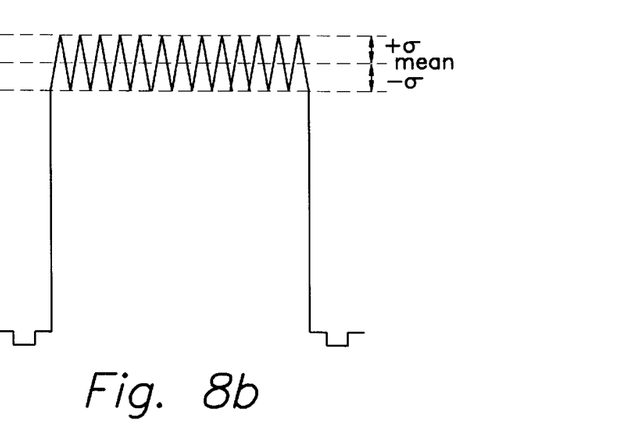
Figure 8C:
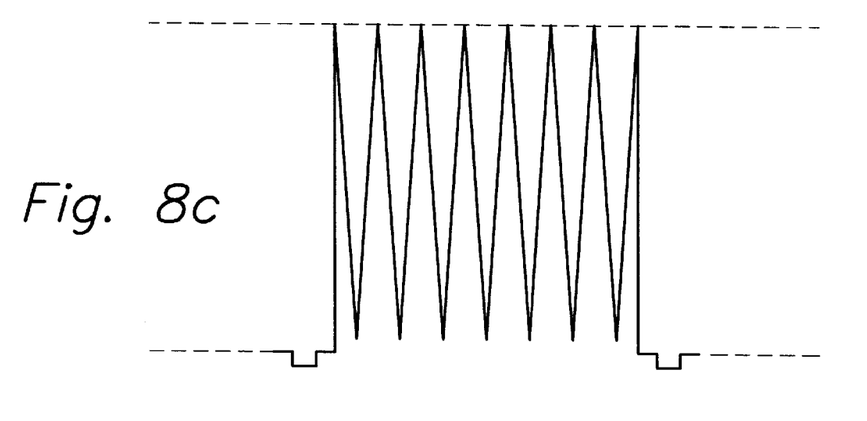

Further, according to various aspects of the present invention, signal conversion circuit 26 is suitably configured to process signals nonlinearly based on information from identification circuit 24. In addition, signal processing system 14 may be configured to retain particular information, such as overlay information inserted into the signal, for example to show the time. Referring to FIGS. 6–8, the present invention is useful in displaying signals of low quality and low contrast which typically correspond to signals having a low deviation, often designated as sigma. The identified mean and deviation may be utilized to address or select a gain curve, such as a nonlinear, piecewise linear, or linear gain curve, to enhance the resulting image. For example, signal conversion circuit 26 suitably includes a memory having a look-up table. Accessing the memory based on the properties identified by identification circuit 24 facilitates applying different gain curves particularly suited to enhancing the image. Thus, data may be enhanced without inadvertently removing information intentionally added to the signal, such as overlay, underlay, and symbology information.

For example, referring now to FIGS. 6A–C, the exemplary signal of FIG. 6B suitably comprises sensor data 150 (information content) and overlay data 152. The combined signal has a mean of approximately 0.5 and a low deviation. When the mean and deviation data are provided to the lookup table in signal conversion circuit 26, a gain curve designed to enhance the data and retain the overlay information is accessed (FIG. 6A). Consequently, data outside the sigma is attenuated and data within the sigma is amplified. This results in enhancement of the signal data and retention of the overlay information (FIG. 6C).

Similarly, as further demonstrated in FIGS. 7A–C and 8A–C, the gain curve which corresponds to a particular identified mean and deviation may suitably optimize the video signal by enhancing the information content of the video signal and attenuating overlay and underlay data. For example, information in a low mean, low deviation environment is enhanced with a gain curve which significantly amplifies low amplitude data (FIGS. 7A–C) without significantly affecting the overlay information. Conversely, information in a high mean, low deviation environment is enhanced with a gain curve which attenuates data falling outside the identified deviation (FIGS. 8A–C). Thus, it should be appreciated that use of dedicated gain curves suitably enables the information content of a video signal to be distributed over the display unit's dynamic range such that less dynamic range (e.g., fewer shades of gray) is utilized to display data outside of the detected mean and deviation of the signal, for example, overlay information.

Signal processing system 14 may be implemented using conventional components. For example, referring now to FIG. 3, a suitable first embodiment of signal processing system 14 in accordance with the present invention comprises a quantizer 30 for converting an analog signal to a digital signal; identification circuits 32, 34 for identifying selected properties of the signals; an adder circuit 36 for modifying the signal according to a selected property identified by identification circuit 32; and a variable gain amplifier 38. Quantizer 30 receives analog signal 100 (FIG. 5A) from signal source 12 and suitably converts it to a digital signal 102.

Figure 3:
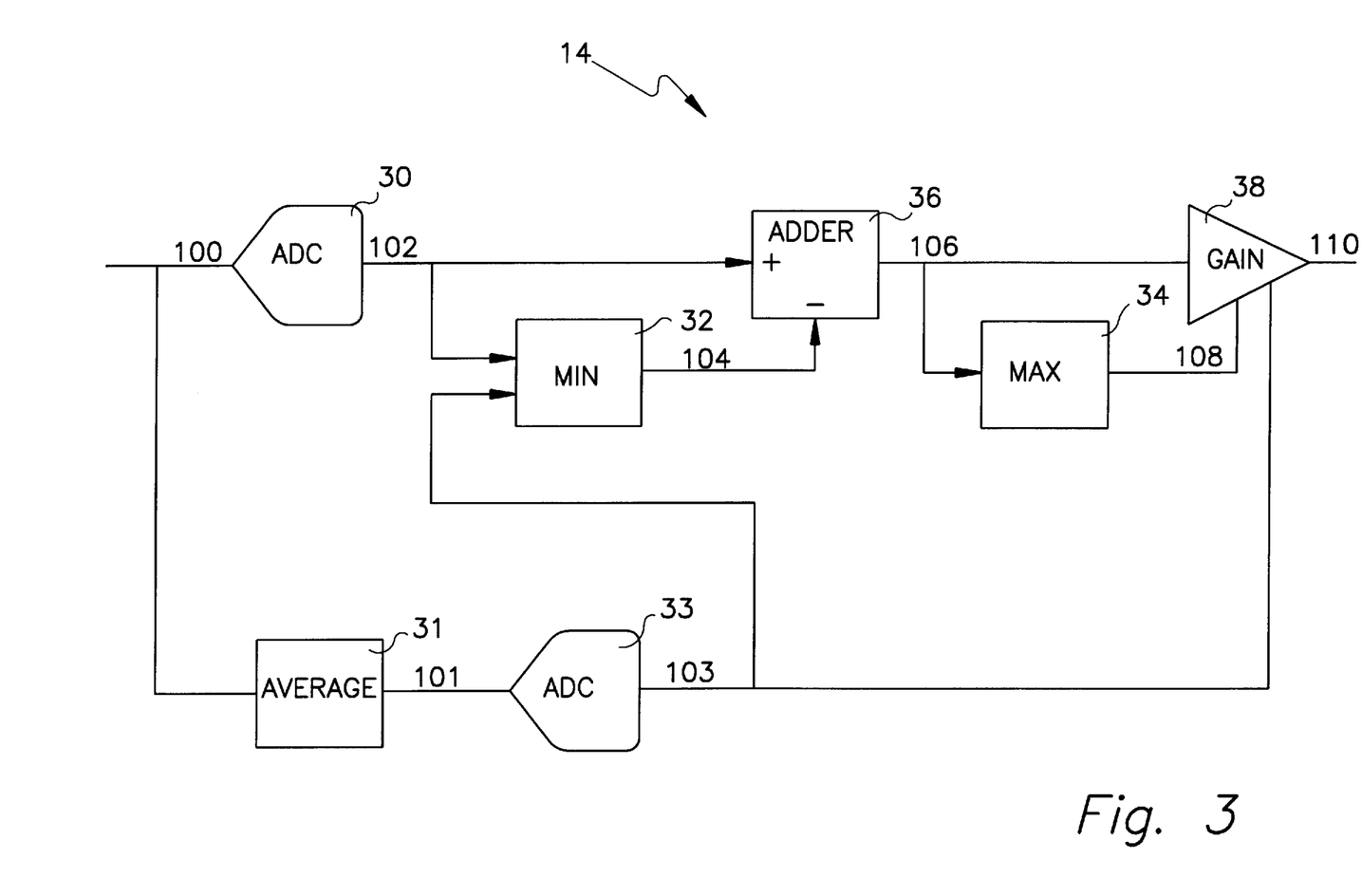
FIG. 3 is a block diagram of an exemplary embodiment of the signal processing system of FIG. 2.

Digital signal 102 is received by identification circuit 32 and adder circuit 36. Identification circuit 32 suitably identifies a first selected property, such as the minimum value in a sample (for example, a frame of video data) of digital signal 102 and transmits this identified minimum to adder circuit 36. Adder circuit 36 suitably receives digital signal 102 at its positive input terminal and the identified minimum of digital signal 102 at its negative input terminal. Accordingly, adder circuit 36 subtracts the identified minimum from digital signal 102 and outputs a shifted signal 106 to variable gain amplifier 38 and second identification circuit 34 (FIG. 5B).

Second identification circuit 34 suitably identifies a second property of shifted signal 106, such as the peak value in the sample. Second identification circuit 34 transmits a corresponding control signal 108 to variable gain amplifier 38. Variable gain amplifier 38 suitably comprises any variable gain amplifier output stage configured to generate a video signal based on shifted signal 106 and the output of second identification circuit 34. In the present embodiment, the output of second identification circuit 34 suitably generates a value inversely proportional to the peak value of shifted signal 106, i.e., a lower peak results in higher gain, and conversely, a higher peak results in lower gain. Variable gain amplifier 38 amplifies shifted signal 106 to generate an enhanced signal 110 (FIG. 5C).

The gain applied to shifted signal 106 by variable gain amplifier 38 is suitably based on predetermined characteristics of the display unit as well as the identified peak 108 of shifted signal 106. For example, it is generally undesirable to amplify the signal such that the peak of enhanced signal 110 exceeds the full scale dynamic range of display unit 16; thus, the gain of amplifier 38 may be adjusted such that the resultant signal is within the dynamic range of display unit 16.

In accordance with various further aspects of this first embodiment, signal processing circuit 14 may further comprise a third identification circuit 31 which suitably identifies the average amplitude. Average amplitude may suitably be identified from analog signal 100 or digital signal 102. In accordance with a preferred aspect of this embodiment, an analog average 101 of analog signal 100 is identified, for example using identification circuit 31 (e.g., averaging filter 31). If the average is identified from analog signal 100, a second quantizer 33 may be provided. Second quantizer 33 suitably converts analog average 101 to a digital average 103.

Any devices or circuitry capable of determining the selected properties of the signal, such as those mentioned above, may be employed in identification circuit 24. For example, an accumulator may be utilized to identify an average amplitude of a frame of data. Such an accumulator may be configured to accumulate the pixel data on an individual or sample basis. Further, the resulting average of a given frame of data may be employed to identify an average deviation. For example, by determining the difference between the incoming pixels (or a sample of incoming pixels) and the previous frame's average and accumulating the difference, the average deviation of the current frame may be identified.

The identified average 103 is suitably utilized to determine how or whether signal 102 should be shifted. As previously described, where identified average 103 corresponds to the median of the dynamic range of display unit 16 it may not be desirable to shift signal 102; if the identified average indicates that the video signal is near the saturation level of display unit 16, however, shifting of signal 102 may be desirable. Thus, first identification circuit 32 suitably receives the output of third identification circuit 33, and further includes a mechanism to disable the shifting function based on the average.

Figure 9:
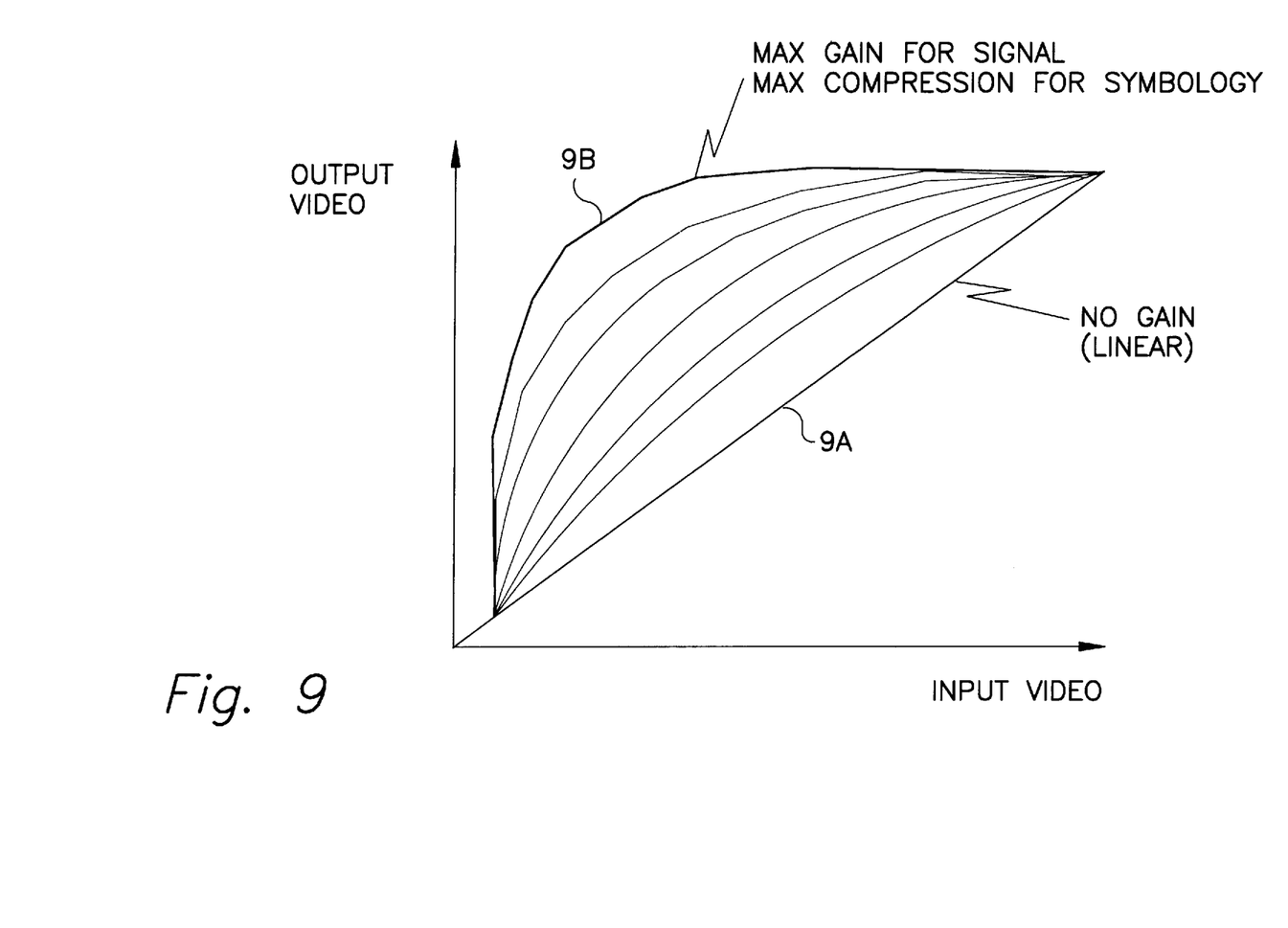
FIG. 9 illustrates exemplary nonlinear gain curves.

Further, the signal average established by third identification circuit 31 may be provided to variable gain amplifier 38 as a criteria affecting the gain of amplifier 38. For example, as described above, an atypical peak, for example due to overlay or underlay information in the signal, may result in second identification circuit 34 causing a very low gain. A low average signal, however, in spite of a peak may cause an increase in the gain, so that even though the anomalous peaks may be clipped, the data of interest to the user is sufficiently amplified. For example, referring to FIG. 9, where a signal has a low average amplitude yet has an atypical peak, a gain curve such as curve 9B may be selected to suitably enhance the information data while suppressing the atypical peak. Similarly, where a signal's average is identified to be approximately that of display unit's 16 median dynamic range and a minimum and maximum amplitude have been identified near base line and full scale respectively, it may not be desirable to amplify or enhance the signal. In which case, curve 9A, a linear unity gain curve, may suitably be automatically selected and applied to the signal based on the combined criteria.

Figure 4:
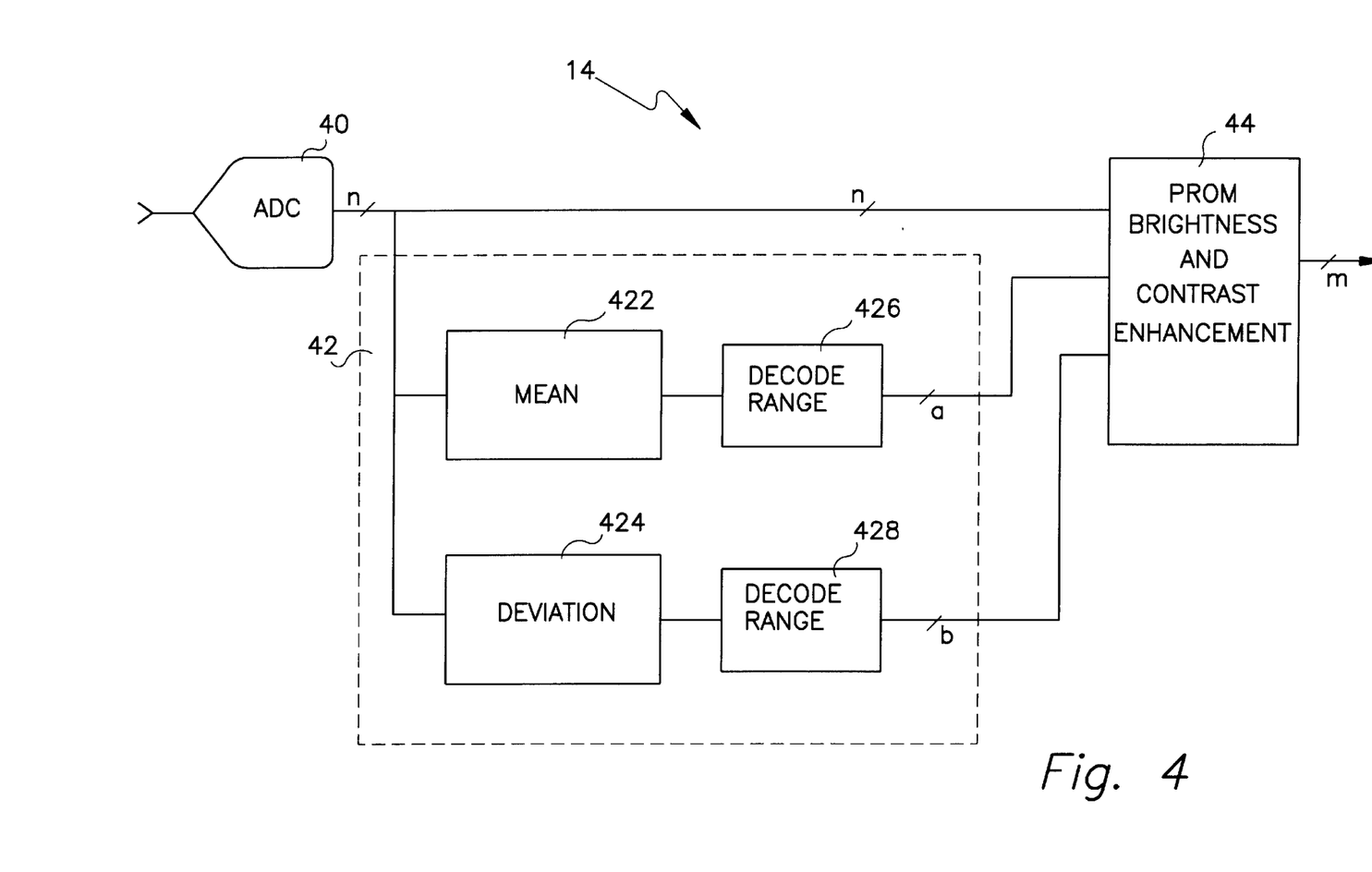
FIG. 4 is a block diagram of an alternative exemplary embodiment of the signal processing system of FIG. 2.

Signal processing system 14 may also be implemented using integrated chips and other components. Referring now to FIG. 4 and in accordance with another embodiment of the present invention, signal processing system 14 suitably comprises a quantizer 40, a signal identification circuit 42, and a signal enhancement circuit 44. Quantizer 40 converts an analog signal to a digital signal. Signal identification circuit 42 suitably identifies the desired properties of a sample of the digitized signal, such as mean, median, average deviation or standard deviation. In accordance with this embodiment, signal identification circuit 42 suitably identifies the mean and the average deviation of the digitized signal.

Any component, device, or circuit capable of identifying a signal's mean and average deviation may be utilized. In accordance with a preferred embodiment of this second embodiment, identification circuit 42 comprises a programmable logic device (PLD) which is programmed to identify the relevant properties. A portion of the PLD may be configured to identify the signal mean 422 for the signal sample. Further, a second portion of the PLD may be suitably configured to identify the deviation 424, such as the average deviation or standard deviation, of the signal sample.

Signal enhancement circuit 44 suitably comprises a programmable read-only memory (PROM) storing at least one look-up table, suitably containing gain curves to be applied to a video signal to selectively enhance the signal. In accordance with various aspects of this embodiment, a finite number of gain curves are contained in signal conversion circuit 44. The curves stored in signal conversion circuit 44 may suitably be selected based on properties of the signal. The number of potential combinations of signal properties, however, may exceed the finite number of gain curves programmed into the PROM of signal conversion circuit 44.

Thus, to facilitate programming and addressing of the PROM and in accordance with various aspects of the present invention, identification circuit 42 may further comprise respective decode range circuits 426 and 428. Each decode range circuit 426 suitably decodes a range of identified mean values to generate a uniform value. For example, decode range circuit 426 may be configured to output an identified mean of 0.5 for all identified means in the range of 0.4 to 0.6. Similarly, decode range circuit 428 suitably decodes a range of identified average deviation values to a particular value. Accordingly, decode range circuits 426, 428 receive the identified mean and identified average deviation, respectively, from mean identification circuit 422 and deviation identification circuit 424. Range decode circuits 426, 428 provide a range decoded identified mean and a range decoded identified deviation to signal enhancement circuit 44.

The range decoded identified mean and range decoded identified deviation are suitably provided as address inputs to the PROM. The PROM is suitably programmed with data corresponding to selected gain curves. For example, all of the addresses within a particular range may correspond to signal outputs for a particular identified average and a range of identified deviation values. Similarly, another range of addresses suitably stores values corresponding to signal outputs for a second identified average over the same range of identified deviation values. When the range decoded information is used to access a particular address in the PROM, the PROM generates an output corresponding to the amplified signal appropriate to the range decoded information. Applying the gain to the original signal using the PROM thus selectively enhances the signal according to the appropriate gain curve.

As noted above, the signal processing circuit 14 of the present invention may suitably be applied in the context of a color display system by using three separate streams of data from signal source 12 (corresponding, for example, to three color components, such as red, green, and blue) and combining the streams for presentation at display unit 16. For example, referring now to FIG. 10 and in accordance with a third embodiment of the present invention, input signal 200 from signal source 12 suitably comprises three separate data streams corresponding to red 200R, green 200G, and blue 200B. Input signal 200 is suitably received by signal processing circuit 14. A suitable signal processing circuit 14 in accordance with this third embodiment of the present invention comprises input average detector 50, interface 22, identification circuit 24, and signal conversion circuit 26.

Figure 10:
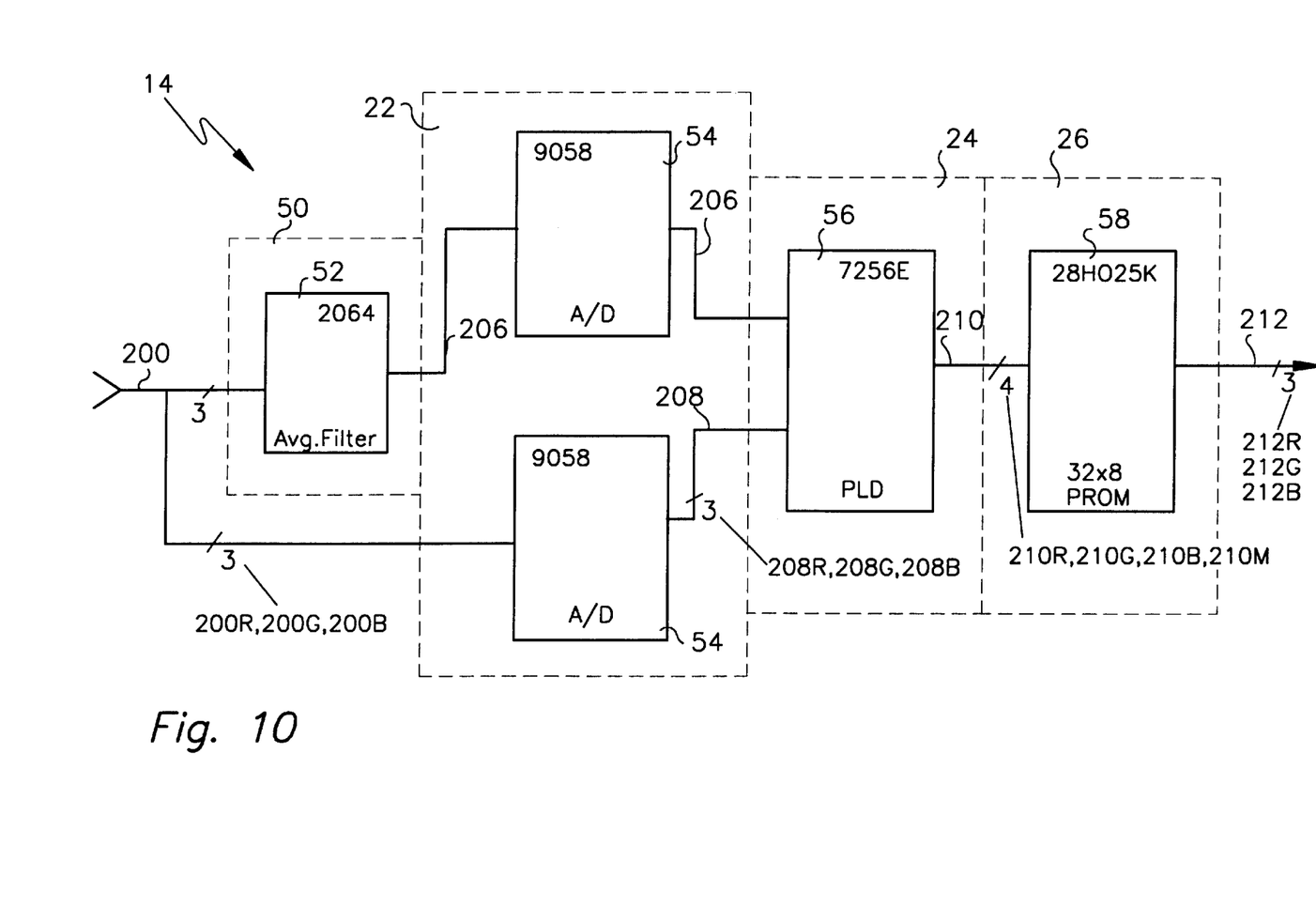
FIG. 10 is a block diagram of an alternative exemplary embodiment of the signal processing system of FIG. 2.
Figure 11:
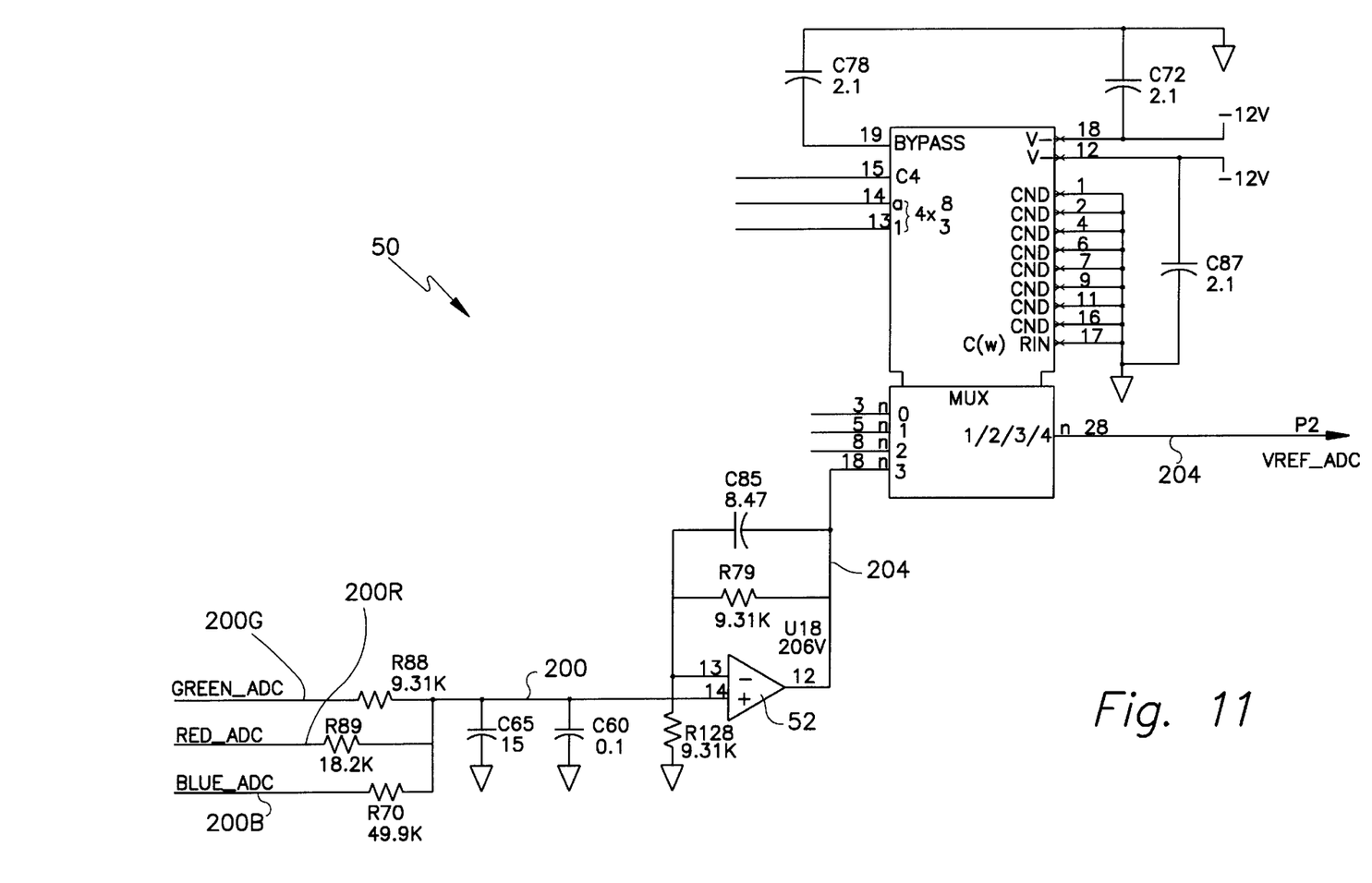
FIG. 11 is a schematic drawing of an averaging circuit of the alternative exemplary embodiment of the signal processing system of FIG. 10.

Average detector 50 suitably receives analog input signal 200 and determines input signal 200's average amplitude. Any circuit, component, or device capable of determining the average of an analog signal may be utilized for input average detector 50. Referring to FIG. 11, a preferred input average detector 50 in accordance with this third embodiment includes a conventional op amp, such as a Texas Instrument TLE 2064. As shown in FIG. 11, input signals 200R, 200G, and 200B are received into filter 52 through a summing junction. Filter 52 accordingly determines signal 200's average amplitude and provides the average amplitude 204 to interface 22 via a multiplexer.

Interface 22 suitably comprises analog-to-digital converters (ADCs) which take analog signals, such as output signal 204 from average detector 50, and converts the analog signals to digital signals. In accordance with this third embodiment, a preferred input interface 22 comprises an Analog Devices AD9058 (ADC) 54. Input signals 200R, 200G, and 200B and analog signal average 204 are each received into individual ADCs 54. ADC 54 provides a digitized signal 208R, 208G, and 208B (collectively signal 208) and a digitized average signal 206 to signal identification circuit 24.

Signal identification circuit 24 suitably identifies properties of a signal. More particularly, signal identification circuit 24 according to this third embodiment suitably identifies digital input signal 208's minimum amplitude within a sample. As discussed above, any circuit, component, or device capable of identifying a signal's minimum amplitude may comprise signal identification circuit 24. In accordance with this third embodiment, identification circuit 24 comprises a Programmable Logic Device (PLD) 56. PLDs typically comprise various configurations of logic gates, such as AND, OR and NOR gates. PLDs may suitably be configured (or programmed) to implement various algorithms. Accordingly, PLD 56 may suitably be configured to perform various arithmetic operations, such as those that may be used in identifying a variety of signal properties. A suitable PLD 56 comprises Altera EPM7256E.

In accordance with this third embodiment, PLD 56 is configured to identify signal's 208 minimum amplitude. PLD 56 is further configured to shift a signal based on signal's 206 minimum amplitude (i.e., subtract the identified minimum from the signal) and to similarly shift the signal's average based on signal's 208 minimum amplitude (i.e., subtract the identified minimum from the signal average). PLD 56 may be programmed to identify the minimum amplitude of input signal 208R, 208G, and 208B. In accordance with a preferred aspect of this third embodiment, PLD 56 is suitably configured to identify input signal 208G's minimum amplitude.

More particularly, PLD 56 suitably receives input signal 208R, 208G, and 208B and signal average 206. PLD 56 identifies the minimum amplitude of green signal 208G input signals 208R, 208G, and 208B and signal average 206. The resulting signals are provided as shifted signals 210R, 210G, 210B, and 210M. Identifying and utilizing a single data stream's minimum amplitude, such as signal 208G (green), is particularly useful to accommodate a monochromatic signal transmitted to a color display.

Signal conversion circuit 26 receives the output from identification circuit 24, more specifically, from PLD 56. As discussed above, signal conversion circuit 26 suitably converts or manipulates a signal in accordance with particular properties of the signal, as identified by identification circuit 24. In accordance with this third embodiment, signal conversion circuit 26 manipulates the signal in accordance with the signal's average and minimum amplitudes via signal 210M (the difference between the average amplitude and minimum amplitude). While a variety of circuits, components, or devices are capable of manipulating a signal to produce a desired or enhanced output signal, a preferred signal conversion circuit 26 in accordance with this third embodiment comprises a plurality of PROMs 58, such as an Atmel 28HC256.

Each PROM 58 suitably provides signal conversion for one of the video signal components (i.e., red, green, or blue signal) and stores a series of gain curves accessible through lookup tables. PROM 58 is suitably programmed such that any combination of shifted signal average and shifted video signal component asserted at the address inputs of PROM 58 generates an output at the data terminals corresponding to a video signal amplified according to a selected gain curve. Thus, one of the shifted video signals 210R, 210G, 210B, and shifted signal average 210M from PLD 56 is provided to each PROM 58. The shifted signal average 210M is suitably provided to the high level address inputs of PROM 58 such that shifted signal average 210M selects the appropriate range of memory addresses (i.e., the appropriate gain curve). The relevant shifted video signal 210 is similarly provided to the lower level addresses to access particular data within PROM 58 to generate an amplified video output to be provided to display unit 16.

The principles of the present invention, particularly the active optimization of the video signal to automatically control the brightness and contrast of a display unit, may be suitably applied to a wide range of scenarios. For example, a recent added feature to automobiles allows a user to access map data from an onboard computer. This map data may comprise street information or a topographical map of a given area. The display of the map may be integrated into the dashboard such as on an LCD, or configured as a HUD projected onto the auto's windshield. Typically, such maps provide low contrast, comprising of subtle shades of brown, green or yellow, such that distinguishing between various shades is difficult. Diverting a driver's attention from the roadway to focus on a low contrast map display (or to attempt to adjust the display manually for enhancement) present obvious hazards. By utilizing the present invention in conjunction with the map display, the brightness and contrast of the image may be automatically optimized and reduce the potential distraction of the driver.

In sum, signal conversion circuitry manipulates the video signal to produce a desired output video signal. Accordingly, any number or configuration of gain curves may be employed depending on the desired aspects of the output video signal. For example, as discussed above, the present invention may be utilized to enhance the information content of a video signal. The manner or extent of enhancement is suitably controlled by the particular gain curves contained in the signal conversion or signal enhancement circuitry.

While the principles of the present invention may suitably be applied to enhance a video signal regardless of the type of display unit, the principles of the present invention are particularly advantageous when used with an LCD. As discussed above, LCDs have limited dynamic range. For example, where an incoming video signal is quantized to 256 shades and the LCD is limited to 64 shades of gray, typical displays lose much of the information in the video signal, or at least render it imperceptible. Accordingly, the present invention analyzes the information content and converts or manipulates the video signal such that the information is spread over more of the available dynamic range. Spreading or enhancing the information content of the video signal in accordance with the present invention suitably reduces loss of information that would result if the information is displayed over only a few shades of gray (a minor portion of the dynamic range).

The foregoing description of preferred exemplary embodiments and best mode of the invention known to the applicant at the time of filing the application has been presented for the purposes of illustration and description. It is not intended to be exhaustive or to limit the invention to the precise form disclosed, and obviously, many modifications and variations are possible in light of the present description. For example, the general principals of sensor signal identification and conversion may be applied to signals other than video, such as sonar. Further, the signal identification functions performed by the PLD could similarly be facilitated in a PROM; similarly, the functions capable of being performed in a PROM may be realized through use of a processor. The various embodiments were chosen and described in order to explain the principles of the invention and its practical application to enable others of ordinary skill in the art to best utilize the invention in various embodiments and with various modifications as are suited to the particular use contemplated. It is intended that the scope of the invention be defined by the claims.

We claim:

1. A signal enhancement system for utilizing a full dynamic display range of a display unit, comprising:

an identification circuit for identifying at least one preselected characteristic of an original signal, wherein the preselected characteristics of the original signal are determined by statistical properties contained within the original signal, the statistical properties being comprised of at least a first property, a second property, and a third property;

a first control circuit responsive to said identification circuit configured to automatically adjust the DC offset of said original signal based on said identified characteristic and the first property to produce a resultant signal; and a second control circuit responsive to said identification circuit configured to automatically adjust the amplification of said resultant signal based on said identified characteristic of said original signal, the full dynamic display range of the display unit, and the second property and the third property, wherein the full dynamic range of the display unit is used.

2. The signal enhancement system of claim 1, wherein:
the first property is a minimum amplitude within a sample of the original signal; and
said first control circuit is configured to automatically reduce the DC offset of said original signal according to the magnitude of said minimum amplitude.

3. The signal enhancement system of claim 2, wherein:
the second property is a maximum amplitude within a sample of the original signal; and
said second control circuit is configured to automatically adjust the amplification of said resultant signal based on said maximum amplitude.

4. The signal enhancement system of claim 2, wherein:
the third property is an average amplitude within a sample of the original signal; and
said second control circuit is configured to automatically adjust the amplification of said resultant signal according to the magnitude of said average amplitude.

5. The signal enhancement system of claim 4, wherein said second control circuit includes a memory, wherein said memory contains at least one gain curve, and said signal is amplified according to one of said gain curves.

6. The signal enhancement system of claim 1, wherein:
at least one of said preselected characteristics includes an average amplitude within a sample of the original signal; and
said first control circuit is configured to automatically adjust the DC offset of said original signal according to the magnitude of said average amplitude.

7. The signal enhancement system of claim 6, wherein:
at least one of said preselected characteristics includes a signal deviation within a sample of the original signal; and
said second control circuit is configured to automatically adjust the amplification of said resultant signal based on said signal deviation.

8. The signal enhancement system of claim 7, wherein said second control circuit is configured to automatically adjust the amplification of said resultant signal according to a piecewise linear gain curve based on said signal deviation, wherein said second control circuit amplifies resultant signal components within the deviation more than signal components outside the deviation.

9. The signal enhancement system of claim 1, wherein said second control circuit amplifies said resultant signal according to a piecewise linear gain curve selected according to said at least one of said identified preselected characteristics.

10. The signal enhancement system of claim 1, wherein said second control circuit amplifies said resultant signal according to a nonlinear gain curve selected according to said at least one of said identified preselected characteristics.

11. A signal enhancement system for use in connection with a signal source configured to generate a signal and a display having a predetermined dynamic range, comprising:
 a signal identification circuit configured to identify aspects of the signal relating to desired information contained therein; and
 a signal enhancement circuit configured to adjust the amplitude of portions of the signal based upon said identified aspects such that said desired information is displayed over a greater portion of the display's dynamic range, wherein:
  at least one of said identified aspects includes a minimum amplitude of the signal; and
  said signal enhancement circuit is configured to automatically reduce the DC offset of said signal according to said minimum amplitude.

12. The signal enhancement system of claim 11, wherein:
 at least one of said identified aspects includes a maximum amplitude of the signal; and
 said signal enhancement circuit is configured to automatically adjust the amplification of the signal based on said maximum amplitude.

13. The signal enhancement system of claim 11, wherein:
 at least one of said identified aspects includes an average amplitude of the signal; and
 said signal enhancement circuit is configured to automatically adjust the amplification of the signal according to said average amplitude.

14. The signal enhancement system of claim 13, wherein said signal enhancement circuit includes a memory, wherein said memory contains at least one gain curve, and wherein the signal is amplified according to one of said gain curves selected according to said average amplitude.

15. A signal enhancement system for use in connection with a signal source configured to generate a signal and a display having a predetermined dynamic range, comprising:
 a signal identification circuit configured to identify aspects of the signal relating to desired information contained therein; and
 a signal enhancement circuit configured to adjust the amplitude of portions of the signal based upon said identified aspects such that said desired information is displayed over a greater portion of the display's dynamic range;
 wherein at least one of said identified aspects is an average amplitude within a sample of the signal, and said signal enhancement circuit is configured to automatically adjust the DC offset of said signal according to said average amplitude; and
 wherein at least one of said identified aspects is a signal deviation of the signal, and said signal enhancement circuit is configured to automatically adjust the amplification of said signal based on said signal deviation; and
 wherein said signal enhancement circuit is configured to automatically adjust the amplification of said signal according to a piecewise linear gain curve based on said signal deviation, wherein said signal enhancement circuit amplifies signal components within the deviation more than signal components outside the deviation.

16. The signal enhancement system of claim 11, wherein said signal enhancement circuit amplifies said signal according to a piecewise linear gain curve selected according to said at least one of said identified aspects.

17. The signal enhancement system of claim 11, wherein said second control circuit amplifies said signal according to a nonlinear gain curve selected according to said at least one of said identified aspects.

18. A method of processing video signals to maximize distribution of the video signal over a dynamic range of a display, comprising the steps of:
 identifying an amplitude property of the video signal, wherein the identified amplitude property comprises a first statistical property contained within the video signal;
 identifying a distribution property of the video signal relative to the dynamic range of the display, wherein the identified distribution property comprises a second statistical property and a third statistical property contained within the video signal;
 automatically adjusting the DC offset of the video signal based on the first statistical property of the identified amplitude property; and
 automatically adjusting the amplification of the video signal based on the second statistical property and the third statistical property of the identified distribution property.

19. The method of claim 18, wherein said first statistical property includes a minimum amplitude of the signal.

20. The method of claim 19, wherein said second statistical property includes a maximum amplitude of the signal.

21. The method of claim 19, wherein said third statistical property includes an average amplitude of the signal.

22. The method of claim 21, wherein said step of automatically adjusting the amplification includes:
 accessing a memory containing at least one gain curve; and
 adjusting the amplification of the video signal according to one of said gain curves.

23. The method of claim 21, wherein said distribution property includes a signal deviation of the signal, and said step of automatically adjusting the amplification includes adjusting the amplification of the signal based on said signal deviation.

24. The method of claim 23, wherein said step of automatically adjusting the amplification includes adjusting the amplification of said signal according to a piecewise linear gain curve based on said signal deviation, wherein signal components within said deviation are amplified more than signal components outside said deviation.

25. The method of claim 18, wherein said step of automatically adjusting the amplification includes adjusting the amplification according to a piecewise linear gain curve selected according to said distribution property.

26. The method of claim 18, wherein said step of automatically adjusting the amplification includes adjusting the amplification according to a nonlinear gain curve selected according to said distribution property.

* * * * *